Patented Apr. 5, 1932

1,852,264

UNITED STATES PATENT OFFICE

ERIK LUDVIG RINMAN, OF DJURSHOLM, SWEDEN

METHOD OF DRY DISTILLING WASTE LIQUORS FROM THE SODA PULP MANUFACTURE

No Drawing. Application filed October 5, 1929, Serial No. 397,747, and in Sweden July 15, 1929.

I have previously described, see for instance the U. S. Patents Nos. 1,196,290 and 1,347,713, processes of alkalizing and subsequently dry distilling the waste liquors from the soda or sulphate pulp manufacture, said processes consisting in first alkalizing such waste liquors with caustic soda lye and lime, or with soda and lime, and afterwards dry distilling the same in a certain manner. If the alkalization is effected with caustic soda lye and lime the dry distillation gives a very high yield of valuable chemical products, but this method of alkalization is expensive. Alkalization with soda and lime, on the other hand, is considerably cheaper but does not give so high a yield of chemical products during the dry distillation.

The present invention relates to a method of alkalizing the said waste liquors for the purpose of dry distilling the same, which method is quite as inexpensive as the last-mentioned method and which, at the same time, gives an even higher yield of valuable chemical products than the first mentioned method during the dry distillation. The present method consists principally in that the alkalization of the waste liquors from the soda or sulphate pulp manufacture is effected with oxides or hydroxides of barium or strontium, or a mixture of both, optionally in combination with a neutral substance, for instance carbonates of the bases used, or carbon powder. In certain cases it may also be suitable during the alkalization to add oxides or hydroxides of calcium, magnesium, aluminium, zinc, or iron, or mixtures thereof.

When alkalization has been effected in this manner, the mass is evaporated to a suitable degree of dryness, and is dry distilled according to known methods, preferably in the presence of steam. During the dry distillation a distillate is formed which contains methyl alcohol, acetone, methyl-ethyl ketone, acetone oil, and other oils, and hydrogen, and which is taken care of in a manner to be further described here below. From the dry distillation residue obtained the soda therein contained is first leached out in the state of soda or caustic soda lye, or mixtures thereof, after which the residue, freed from soda to a suitable extent, is burnt according to known methods so that oxides or hydroxides of barium or strontium, or mixtures thereof, are obtained, possibly mixed with oxides of calcium, aluminium, and so forth, which are again used for the alkalization of fresh quantities of waste liquor.

Since the manner of carrying out the present method in practice is similar whether barium hydroxide or strontium hydroxide is used, the following description will for simplicity's sake deal with the carrying out of the method with the use of barium hydroxide, which is at present cheaper than strontium hydroxide.

The waste liquors which are particularly adapted to be treated according to the present method, are those obtained in the production of cellulose according to the caustic soda lye or sulphate process from wood, straw, esparto, reed, and similar fibrous substances.

Waste liquors obtained by boiling with caustic soda lye, however, are more suitable than such obtained by boiling with sulphate lye, for the reason that the sulphur content of the sulphate lye gives rise to the formation of mercaptans and organic sulphides which contaminate the chemical products obtained.

Preparatory to the treatment the waste liquor is evaporated in the usual manner and approximately to the usual concentration, i. e. to a specific gravity of approximately 1.25. It has then a water content of approximately 50 per cent in the case of waste liquor from the wood pulp manufacture, and of between 40 and 50 per cent in the case of waste liquor from straw and esparto cellulose or the like, and holds a quantity of dry substance which in the first instance amounts to about 750 kg., and in the second instance to about 660 kg., per 1000 kg. absolutely dry raw material. To the waste liquor thus evaporated barium hydroxide is added, preferebly while the liquor is hot, so that the barium hydroxide is dissolved. If the barium hydroxide is absolutely free from water, it is suitable to moist the same so that it obtains a water content corresponding to at least one molecule water of crystallization. The barium may also be added in the form of oxide, but as a rule it is more suitable first to transform the oxide into moist hydroxide. The admixture may suitably be effected in an ordinary open receptacle provided with a stirring apparatus.

The quantity of barium hydroxide to be added may be varied depending upon the result that it is desired to obtain by the dry distillation. Said quantity may suitably vary from one to three molecules $BaO_2H_2$ for each molecule $Na_2O$ in the black liquor. A very good result of the dry distillation is obtained by an addition of 2 molecules $BaO_2H_2$ for each molecule $Na_2O$. If desired, the reaction during the dry distillation may be caused to run more slowly by an admixture of a neutral substance, for instance carbon powder. Such admixture may also have a favourable effect on the final evaporation of the mass before the dry distillation.

The liquor obtained by the alkalization, and which is termed thick liquor here below, may be dry distilled in the manner and by the use of the apparatus described in the U. S. Patent No. 1,483,554. For this purpose it is only required to load the liquor on multi-floor trucks, run said trucks into the dry distillation furnace, and perform the dry distillation in accordance with the principles disclosed in my U. S. Patent No. 1,347,713.

Since the thick liquor can be evaporated already at temperatures from 100° to 150° C. to a dry pulverous mass, which does not sinter when heated, the evaporation of the mass to dryness as well as the dry distillation may be performed in an externally heated rotary furnace in which the thick liquor is introduced at one end, while the distillate as well as the dry distillation residue are removed at the other end. Such furnace must of course be closed airtight, and the dry distillation residue may therefore suitably be removed through a water seal.

A safer method of working which also gives a greater yield of chemical products during the dry distillation for the reason that it renders it possible to maintain a suitable grain size of the mass, is obtained, however, if the following course is adopted. The above-mentioned thick liquor is first evaporated to dryness to a granular or pulverous mass which is so strongly evaporated that when heated it does not sinter or smelt. The pulverous mass thus obtained can afterwards be dry distilled without difficulty in an externally heated and continuously operating extended furnace through which the mass is fed by means of suitable conveyers, for instance of the screw conveyer type.

For evaporating the thick liquor to dryness rotary drying cylinders may suitably be used, which may be heated indirectly by steam or hot gases of combustion, and the evaporation may simultaneously be accelerated by direct admission of air heated to approximately 150° C. The thick liquor may be run on to the cylinder shell on one side and be scraped off by means of scrapers on the other side, while the cylinder is heated internally with low pressure steam or with combustion gases. The thick liquor may also be discharged on to the inner surface of the cylinder, and the cylinder may be heated externally. Furthermore, it is also possible to use an extended externally heated rotary cylinder in which the thick liquor is introduced at one end, while the evaporated dry mass is discharged at the other end. Said cylinder is then preferably heated externally by means of gases of combustion having a temperature of about 200° C.

Simultaneously hot air having a temperature of 150° C., for instance, is admitted directly into the furnace in order to accelerate the evaporation of the mass. Such air is preferably admitted in counter-flow to the mass. Care should be taken that the temperature in the furnace does not rise above 150° C., particularly at that end of the furnace where the mass begins to become dry. The evaporated mass obtained from this furnace is afterwards crushed to a suitable grain size, not exceeding 10 mm. in diameter. The mass is now ready to be introduced into the dry distillation furnace.

The dry distillation furnace may suitably consist of an extended cylindrical furnace of sheet iron in which a conveyer, for instance of the screw conveyer type, is provided for slow feeding of the mass from one end of the furnace to the other, for instance in 4 to 8 hours' time. The conveyer should be so constructed that it does not obstruct the flow of the gases through the furnace, and so that it assists to bring the gases into intimate contact with the mass, without causing excessive formation of dust. The mass is introduced into the furnace through a sluice device in order to prevent air from entering the furnace. For the same reason the distilled mass is removed through a water seal. The furnace is heated externally by means of gases of combustion supplied at a temperature of 600° to 700° C. to that end of the furnace where the mass is removed, and which are afterwards allowed to sweep the furnace or its bottom and are finally led off at the cooler end of the furnace at a temperature of about 200° C.

During the distillation superheated steam is introduced in the furnace since the reaction is thereby furthered. Such steam may be introduced at both ends of the furnace, but the heat value of the steam will be best utilized if the steam, or at least the main portion thereof, is introduced at a temperature of about 500° C. in the hotter end of the furnace, and a distillate is discharged in the vicinity of the cooler end of the furnace at a temperature of 200° to 250° C.

The organic substances formed during the dry distillation and which mainly consist of methyl alcohol, acetone, methyl-ethyl ketone, acetone oil, other oils, and hydrogen, leave the furnace together with steam and are preferably first conducted through a dust separator in order to remove the dust. Afterwards the distillate is conducted to a cooler which serves the purpose of condensing out the abovementioned products so as to separate the same from the gas which mainly consists of hydrogen. The condensate is afterwards separated by means of a Florence flask into a water solution and oils. By treatment with hydrogen the oils may be converted into an easily purified form. The water solution is treated in a continuously operating double column which removes the water and, provided that the second part of the column is provided with an oil separator, yields a concentrate holding about 96 per cent of methyl alcohol, acetone, methyl-ethyl ketone, and acetone oils.

The distillates obtained usually contain ammonia which should be separated, but if such separation were effected by adding, for instance, sulphuric acid to the initial distillate, pitching would very easily ensue in the column, and for this reason a double column should be used in the second part of which the ammonia is fixed with sulphuric acid. The concentrate obtained from the column may suitably be purified in a well-known manner by means of a strong caustic soda lye, so that the greatest possible yield of pure products is obtained. In this way, however, the methyl-ethyl ketone as well as the acetone oil will be obtained in an aqueous state. Such water may be removed by treatment with a strong caustic soda lye, but more suitably by treatment with unslaked lime in a receptacle provided with a stirring device.

As above mentioned, the dry distillation above described gives a gas which mainly consists of hydrogen. Since this gas is very easily purified it may suitably be used for the treatment with hydrogen of the chemical products obtained during the dry distillation, so that said products will be obtained in a more stable form. However, the gas may of course also be used for the synthetic production of ammonia.

It is desirable to obtain from the dry distillation a retort residue which, preferably, does not contain any organic substances, and which only consists of soda and barium carbonate—possibly also barium hydroxide—and small quantities of carbon. This is for the reason that the soda shall be dissolved out from said retort residue, so that after suitably causticizing the same, a caustic soda lye is obtained for digesting fresh quantities of vegetable substances for the production of cellulose. The dissolving of the soda and the separation of the soda solution from the barium carbonate, as well as the production of caustic soda lye from the soda solution, are easily performed if the retort residue is well coked, so that it does not contain any organic substances which form pitch. If the retort residue contains so large an excess of barium not combined with carbon dioxide that it is sufficient to causticize the soda, caustic soda lye will be directly obtained during the leaching, so that no extra operation is required for causticizing the soda solution.

The barium carbonate obtained after leaching out and separating the soda is afterwards burnt according to well-known methods, for instance while supplying a suitable quantity of steam, so that $BaO_2H_2$ is directly formed. The regenerated barium hydroxide or oxide is afterwards used in the manufacture for alkalizing fresh quantities of waste liquor.

The above paragraphs describe in what manner the method is carried out when alkalization is effected by means of barium hydroxide alone. Alkalization with barium hydroxide alone has the disadvantage, however, that the dry distillation requires particular attention on the part of the workmen, since it has a tendency to take a too rapid course. This may be prevented by adding a neutral substance, for instance carbon powder, during the alkalization. It is more suitable, however, to effect the alkalization with a mixture of barium hydroxide and calcium hydroxide. The manner of working is not changed hereby, it only becomes more safe. When the dry distillation residue freed from soda is burnt, however, the lime is regenerated as oxide, even if steam is used during the burning, so that the barium is obtained as hydrate. Before the bases thus regenerated are used for alkalizing concentrated black liquor, they should be treated with so much water that all calcium oxide is converted into calcium hydroxide in such form that the bases can easily be intimately mixed with the waste liquor. This is of course most safely attained if the lime is slaked to milk of lime. The dry distillation itself runs a more quiet course and gives more safely a great yield of chemical products when calcium hydroxide is present. It is also cheaper to work with so great an excess of lime that when leaching out the soda from the dry distillation residue, it will directly form hydroxide. The burning of the dry distillation residue freed from soda is more easily performed if the barium carbonate is intimately mixed with calcium carbonate.

In order to illustrate the present method the following example may be given of a manner in which alkalization may be carried out with barium hydroxide and calcium hydroxide. In order to alkalize a waste liquor obtained in the production of kraft pulp from pine wood, 800 kg. $BaO_2H_2$ and 200 kg. $CaO$ may be used per 1000 kg. dry wood, i. e. per 200 kg. $Na_2O$ in the black liquor. The evaporated black liquor contains, per 1000 kg. dry wood, 750 kg. dry substance and 700 kg. water. To this black liquor 800 kg. $BaO_2H_2$ and 200 kg. $CaO$ slaked with 300 kg. water, are added, so that the total added quantity is 1300 kg., namely 800 kg. $BaO_2H_2$, 264 kg. $CaO_2H_2$, and 236 kg. $H_2O$. After mixing, 2750 kg. liquor, viscous when hot, are obtained, holding 34 per cent $H_2O$. When the dry distillation is carried out in the manner above described this liquor gives approximately 60 kg. methyl alcohol, acetone, methyl-ethyl ketone, and acetone oil, and 300 to 400 $m^3$ hydrogen, as well as about 30 kg. other oils, or in other words a result which is superior to that obtained if for the alkalization the barium hydroxide is replaced by an equivalent amount of sodium hydroxide.

Instead of the lime, or together with the lime, other substances may also be used as an admixture, namely oxides or hydroxides of magnesium, aluminium, zinc, iron or the like, although their action is weaker than that of lime, and the term "hydroxide of calcium" used in the claims should therefore be understood as being equivalent to said substances.

As stated above the barium compounds used in the present method may be replaced by the corresponding strontium compounds, and the term "barium" used in the claims should therefore be understood as being equivalent to strontium.

Similarly, since as above stated, oxides may be used instead of hydroxides, the term "hydroxide" should be understood as being equivalent to oxide.

Also, since as above stated, the method is applicable to waste liquors from the sulphate pulp manufacture, the term "soda pulp" should be understood as being equivalent to sulphate pulp.

I claim:

1. The method of alkalizing waste liquors from the soda pulp manufacture for the purpose of making them suitable for dry distillation, which comprises alkalizing the waste liquor with hydroxide of barium.

2. The method of alkalizing waste liquors from the soda pulp manufacture for the purpose of making them suitable for dry distillation, which comprises alkalizing the waste liquor with hydroxide of barium, and adding carbonate of barium.

3. The method of alkalizing waste liquors from the soda pulp manufacture for the purpose of making them suitable for dry distillation, which comprises alkalizing the waste liquor by means of hydroxide of barium, and adding hydroxide of calcium.

4. The method of alkalizing waste liquors from the soda pulp manufacture for the purpose of making them suitable for dry distillation, which comprises alkalizing the waste liquor with hydroxide of barium, and adding hydroxide of calcium and carbonates of said bases.

5. The method of dry distilling waste liquors from the soda pulp manufacture, which comprises alkalizing the waste liquor with hydroxide of barium, evaporating the waste liquor to a dry mass capable of being pulverized, and dry distilling said mass.

6. The method of dry distilling waste liquors from the soda pulp manufacture, which comprises alkalizing the waste liquor with hydroxide of barium, adding to said liquor hydroxide of calcium, evaporating said liquor to a dry mass capable of being pulverized, pulverizing said mass, and dry distilling the same.

7. The method of dry distilling waste liquors from the soda pulp manufacture, which comprises alkalizing the waste liquor with hydroxide of barium, adding to said liquor hydroxide of calcium and carbonates of said bases, evaporating said liquor to a dry mass capable of being pulverized, pulverizing said mass, and dry distilling said mass.

ERIK LUDVIG RINMAN.